United States Patent
Islam et al.

(10) Patent No.: US 11,477,811 B2
(45) Date of Patent: Oct. 18, 2022

(54) GRANULARITY AND ADJUSTMENT ACCURACY IN AN INTEGRATED ACCESS BACKHAUL NETWORK

(71) Applicant: QUALCOMM Incorporated, San Diego, CA (US)

(72) Inventors: Muhammad Nazmul Islam, Littleton, MA (US); Navid Abedini, Somerset, NJ (US); Luca Blessent, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 16/841,288

(22) Filed: Apr. 6, 2020

(65) Prior Publication Data
US 2020/0322976 A1 Oct. 8, 2020

Related U.S. Application Data

(60) Provisional application No. 62/831,018, filed on Apr. 8, 2019.

(51) Int. Cl.
*H04W 72/12* (2009.01)
(52) U.S. Cl.
CPC .............................. *H04W 72/1273* (2013.01)
(58) Field of Classification Search
None
See application file for complete search history.

(56) References Cited

U.S. PATENT DOCUMENTS

| 2021/0345322 | A1* | 11/2021 | Tiirola | H04W 72/0446 |
| 2022/0078740 | A1* | 3/2022 | Harada | H04W 56/0045 |
| 2022/0078837 | A1* | 3/2022 | Harada | H04W 72/0446 |

OTHER PUBLICATIONS

Huwaei, "DL transmission timing alignment for IAB", Feb. 2019, 3GPP TSG RAN, R1-1901534, pp. 1-6.*
Huawei, "DL transmission timing alignment for IAB", Feb. 2019, 3GPP TSG RAN, R1-1901534, pp. 1-6.*
Ericsson: "Clarifications on IAB OTA Timing Alignment", 3GPP Draft, 3GPP TSG RAN WG1 Meeting #96bis, R1-1905596, 3rd Generation Partnership Project (3GPP), Mobile Competence Centre, 650, Route Des Lucioles, F-06921, Sophia-Antipolis Cedex, France, vol. RAN WG1, No. Xi 'an. China; Apr. 8, 2019-Apr. 12, 2019, Apr. 7, 2019 (Apr. 7, 2019), XP051700354, 4 pages, Retrieved from the Internet: URL:http://www.3gpp.org/ftp/Meetings%5F3GPP%5FSYNC/RAN1/Docs/R1%2D1905596%2Ezip [retrieved on Apr. 7, 2019], the whole document.

(Continued)

*Primary Examiner* — Adnan Baig
(74) *Attorney, Agent, or Firm* — Harrity & Harrity, LLP

(57) ABSTRACT

Various aspects of the present disclosure generally relate to wireless communication. In some aspects, a node, such as a node in an integrated access backhaul (IAB) deployment, may receive information identifying a timing advance value and a timing assistance value, wherein the timing assistance value is associated with a configuration parameter. The node may perform a downlink transmission to a child node of the node based at least in part on the timing advance value and the timing assistance value and in accordance with the configuration parameter. Numerous other aspects are provided.

32 Claims, 7 Drawing Sheets

(56) References Cited

OTHER PUBLICATIONS

Ericsson: "IAB OTA Timing Alignment",3GPP Draft, 3GPP TSG RAN WG1 Meeting #96, R1-1902413, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 25, 2019-Mar. 1, 2019, Feb. 15, 2019 (Feb. 25, 2019), XP051600109, 4 pages, Retrieved from the Internet: URL:http://www.3gpp.org/ftp/tsg%5Fran/WG1%5FRL1/TSGR1%5F96/Docs/R1%2D1902413%2Ezip [retrieved on Feb. 15, 2019]the whole document.

Huawei, et al., "DL Transmission Timing Alignment for IAB," 3GPP Draft, 3GPP TSG RAN WG1 Meeting #96, R1-1901534, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 25, 2019-Mar. 1, 2019, Feb. 16, 2019 (Feb. 16, 2019), XP051599231, 6 pages, Retrieved from the Internet: URL: http://www.3gpp.org/ftp/tsg%5Fran/WG1%5FRL1/TSGR1%5F96/Docs/R1%2D1901534%2Ezip [retrieved on Feb. 16, 2019]the whole document.

International Search Report and Written Opinion—PCT/US2020/026995—ISA/EPO—dated Jul. 17, 2020.

Nokia, et al., "IAB Case #1 Timing,"3GPP Draft, 3GPP TSG RAN WG1#96, R1-1902434, IAB Timing, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 25, 2019-Mar. 1, 2019, Feb. 15, 2019 (Feb. 15, 2019), XP051600130, 3 pages, Retrieved from the Internet: URL: http://www.3gpp.org/ftp/tsg%5Fran/WG1%5FRL1/TSGR1%5F96/Docs/R1%2D1902434%2Ezip [retrieved on Feb. 15, 2019]Sections 1. 2.

Samsung: "Discussion on OTA Timing Alignment for IAB", 3GPP Draft, 3GPP TSG-RAN WG4 Meeting #90Bis, R4-1903345 Discussion_IAB_T_ Delta_Final, 3rd Generation Partnership Project (3GPP), Mobile Competence Centre, 650, Route Des Lucioles, F-06921, Sophia-Antipolis Cedex, France, vol. RAN WG4. No. Xi 'an, China; Apr. 8, 2019-Apr. 12, 2019, Apr. 1, 2019 (Apr. 1, 2019), XP051713775, 4 pages, Retrieved from the Internet:URL: http://www.3gpp.org/ftp/tsg%5Fran/WG4%5FRadio/TSGR4%5F90Bis/Docs/R4%2D1903345%2Ezip retrieved on Apr. 1, 2019], the whole document.

\* cited by examiner

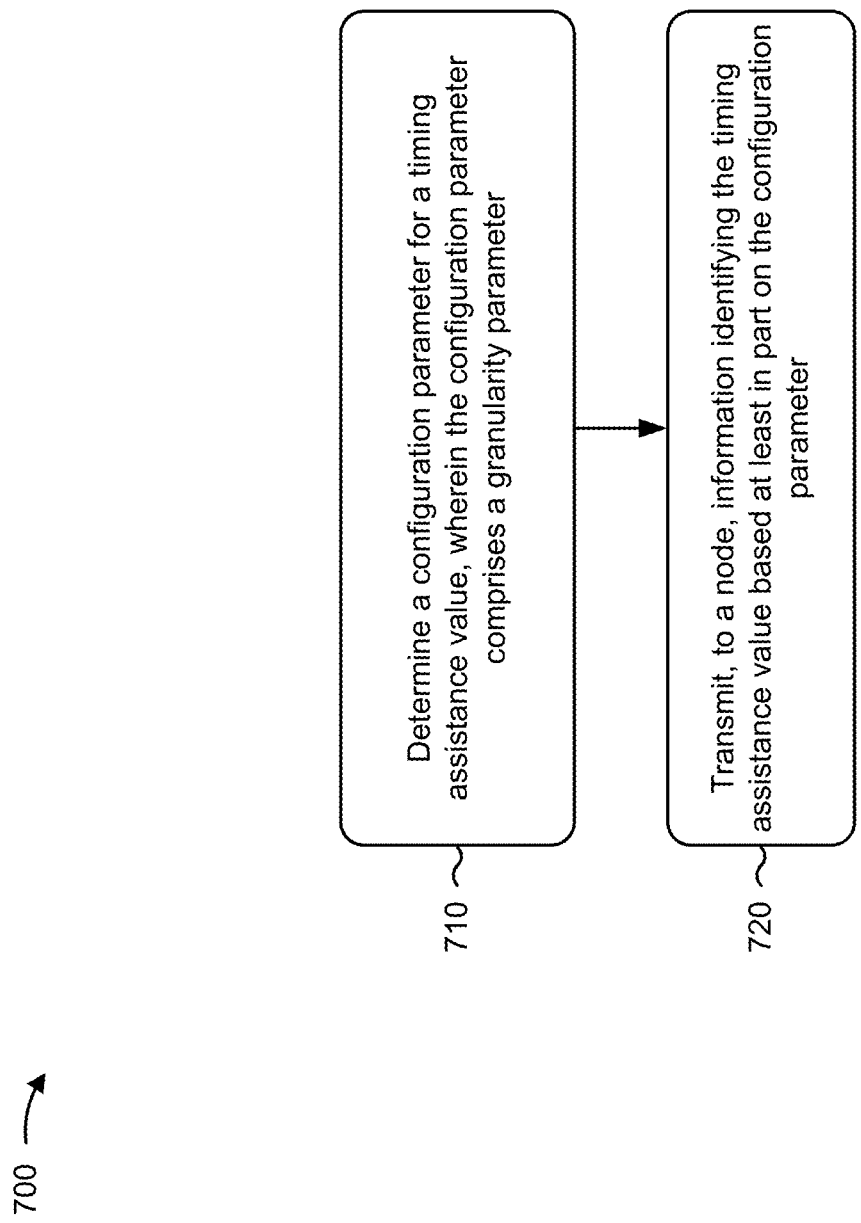

GRANULARITY AND ADJUSTMENT ACCURACY IN AN INTEGRATED ACCESS BACKHAUL NETWORK

CROSS-REFERENCE TO RELATED APPLICATION

This patent application claims priority to U.S. Provisional Patent Application No. 62/831,018, filed on Apr. 8, 2019, entitled "GRANULARITY AND ADJUSTMENT ACCURACY IN AN INTEGRATED ACCESS BACKHAUL NETWORK," and assigned to the assignee hereof. The disclosure of the prior application is considered part of and is incorporated by reference in this patent application.

FIELD OF THE DISCLOSURE

Aspects of the present disclosure generally relate to wireless communication, and to techniques and apparatuses for granularity and adjustment accuracy in an integrated access backhaul network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a node, may include receiving information identifying a timing advance value and a timing assistance value, wherein the timing assistance value is associated with a configuration parameter, wherein the configuration parameter comprises at least one of a granularity parameter or an accuracy parameter; and performing a downlink transmission to a child node of the node based at least in part on the timing advance value and the timing assistance value and in accordance with the configuration parameter.

In some aspects, a node for wireless communication may include memory and one or more processors operatively coupled to the memory. The memory and the one or more processors may be configured to receive information identifying a timing advance value and a timing assistance value, wherein the timing assistance value is associated with a configuration parameter, wherein the configuration parameter comprises at least one of a granularity parameter or an accuracy parameter; and perform a downlink transmission to a child node of the node based at least in part on the timing advance value and the timing assistance value and in accordance with the configuration parameter.

In some aspects, a non-transitory computer-readable medium may store one or more instructions for wireless communication. The one or more instructions, when executed by one or more processors of a node, may cause the one or more processors to: receive information identifying a timing advance value and a timing assistance value, wherein the timing assistance value is associated with a configuration parameter, wherein the configuration parameter comprises at least one of a granularity parameter or an accuracy parameter; and perform a downlink transmission to a child node of the node based at least in part on the timing advance value and the timing assistance value and in accordance with the configuration parameter.

In some aspects, an apparatus for wireless communication may include means for receiving information identifying a timing advance value and a timing assistance value, wherein the timing assistance value is associated with a configuration parameter, wherein the configuration parameter comprises at least one of a granularity parameter or an accuracy parameter; and means for performing a downlink transmission to a child node of the apparatus based at least in part on the timing advance value and the timing assistance value and in accordance with the configuration parameter.

In some aspects, a method of wireless communication, performed by a parent node, may include determining a configuration parameter for a timing assistance value, wherein the configuration parameter comprises a granularity parameter; and transmitting, to a node, information identifying the timing assistance value based at least in part on the configuration parameter.

In some aspects, a parent node for wireless communication may include memory and one or more processors operatively coupled to the memory. The memory and the one or more processors may be configured to determine a configuration parameter for a timing assistance value, wherein the configuration parameter comprises a granularity parameter; and transmit, to a node, information identifying the timing assistance value based at least in part on the configuration parameter.

In some aspects, a non-transitory computer-readable medium may store one or more instructions for wireless communication. The one or more instructions, when executed by one or more processors of a parent node, may cause the one or more processors to: determine a configuration parameter for a timing assistance value, wherein the configuration parameter comprises a granularity parameter; and transmit, to a node, information identifying the timing assistance value based at least in part on the configuration parameter.

In some aspects, an apparatus for wireless communication may include means for determining a configuration parameter for a timing assistance value, wherein the configuration parameter comprises a granularity parameter; and means for transmitting, to a node, information identifying the timing assistance value based at least in part on the configuration parameter.

Aspects generally include a method, apparatus, system, computer program product, non-transitory computer-readable medium, user equipment, base station, wireless communication device, and processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a node of an integrated access backhaul network, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
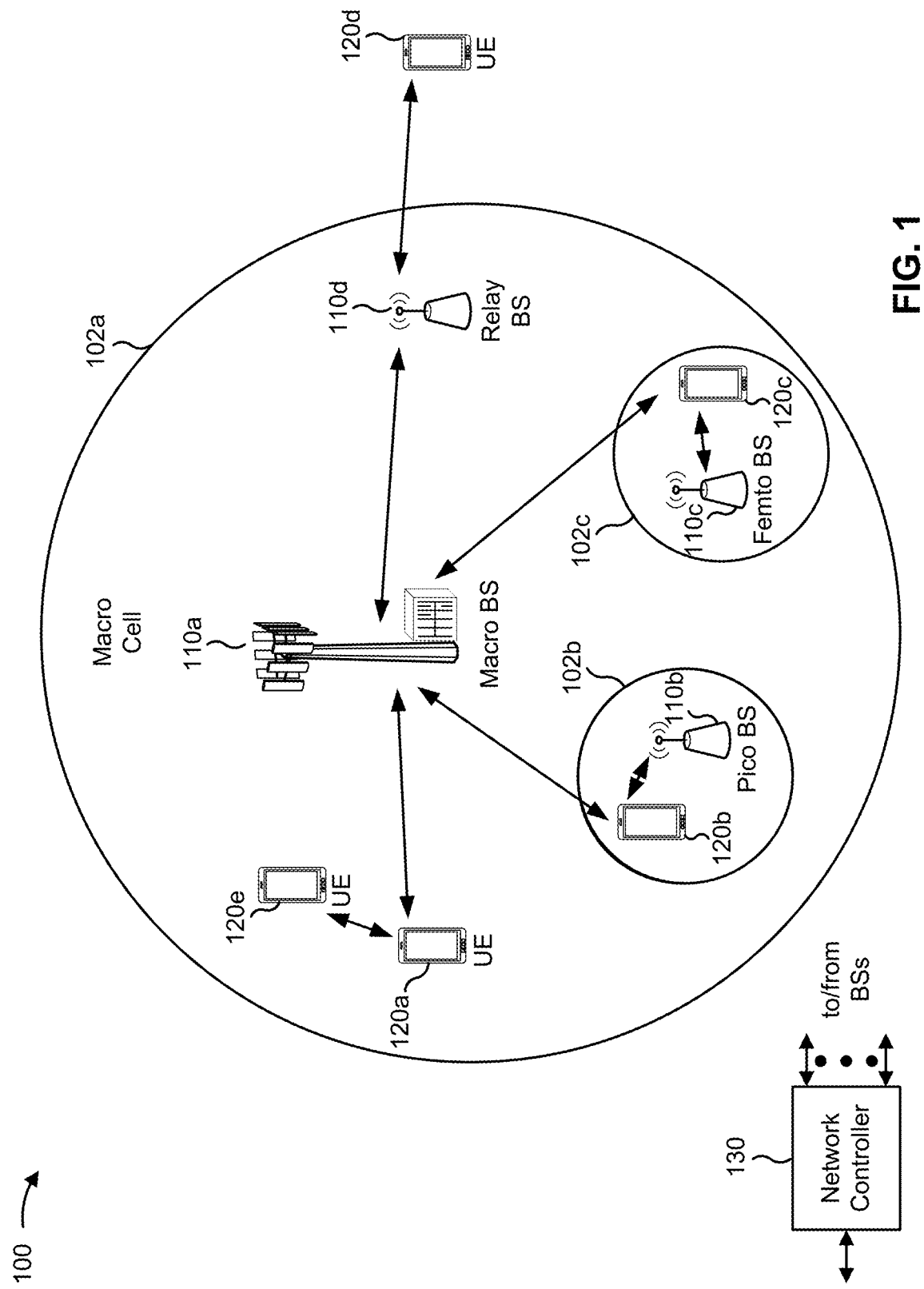
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110

(shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
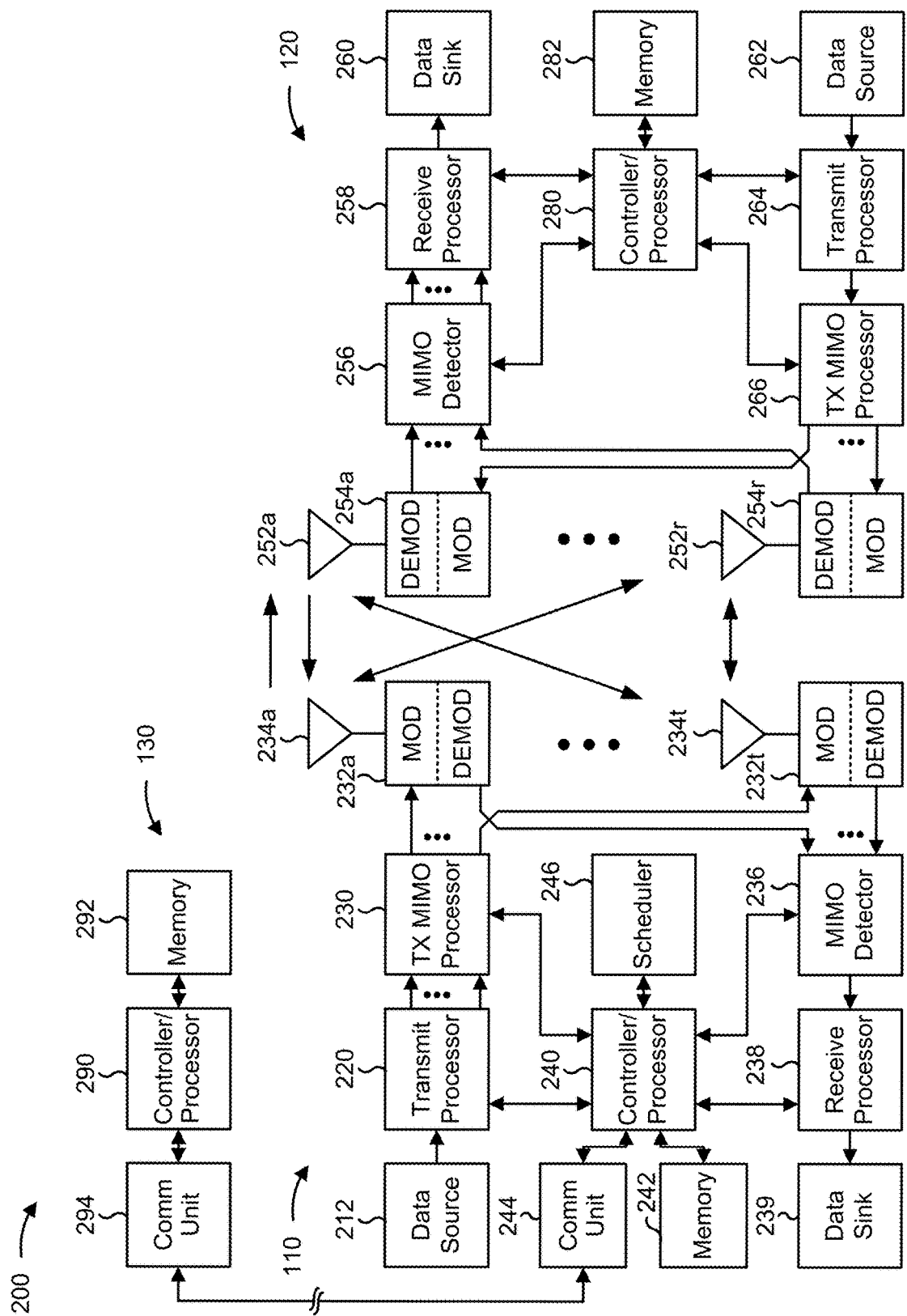
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with granularity and adjustment accuracy in an integrated access backhaul network, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, a node (e.g., UE 120, BS 110, or another node described herein, such as a node of an IAB deployment) may include means for receiving information identifying a timing advance value and a timing assistance value, wherein the timing assistance value is associated with a configuration parameter, wherein the configuration parameter comprises at least one of a granularity parameter or an accuracy parameter; means for performing a downlink transmission to a child node of the node based at least in part on the timing advance value and the timing assistance value and in accordance with the configuration parameter; means for determining the accuracy parameter before performing the downlink transmission; means for determining the granularity parameter before performing the downlink transmission; means for transmitting, to a parent node from which the timing advance value and the timing assistance value are received, information identifying the subcarrier spacing of the communication link between the node and the child node; and/or the like. In some aspects, such means may include one or more components of UE 120 or base station 110 described in connection with FIG. 2.

In some aspects, a parent node (e.g., UE 120, BS 110, or another node described herein, such as a parent node of an IAB deployment) may include means for determining a configuration parameter for a timing assistance value; means for transmitting, to a node, information identifying the timing assistance value based at least in part on the configuration parameter; means for receiving information regarding a communication link between the node and a child node of the node; means for transmitting, to the node, information identifying a timing advance value; and/or the like. In some aspects, such means may include one or more components of UE 120 or base station 110 described in connection with FIG. 2.

As indicated above, FIG. 2 is provided as an example. Other examples may differ from what is described with regard to FIG. 2.

Figure 3:
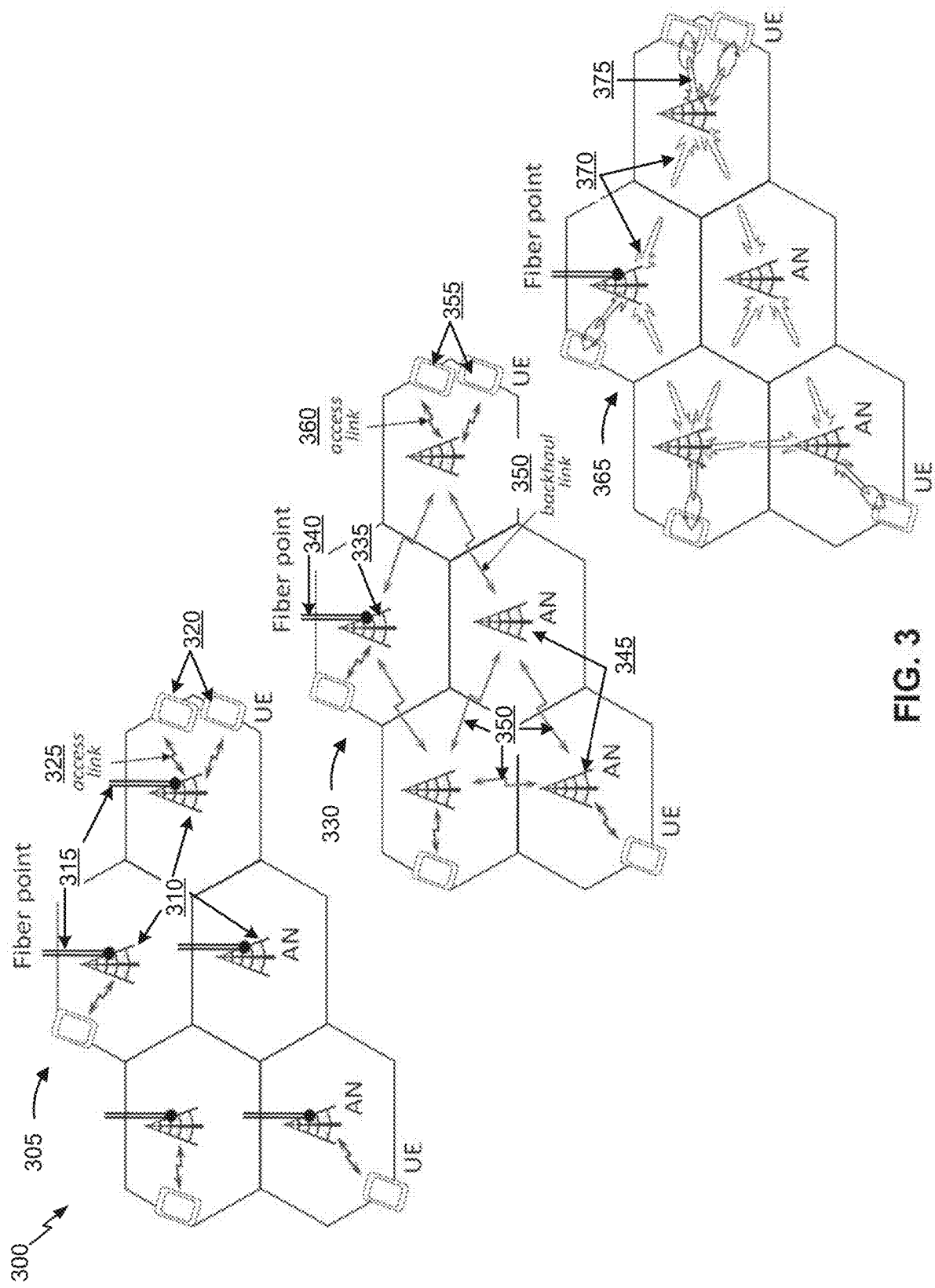
FIG. 3 is a diagram illustrating examples of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (e.g., IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples are possible and may differ from what was described with regard to FIG. 3.

Figure 4:
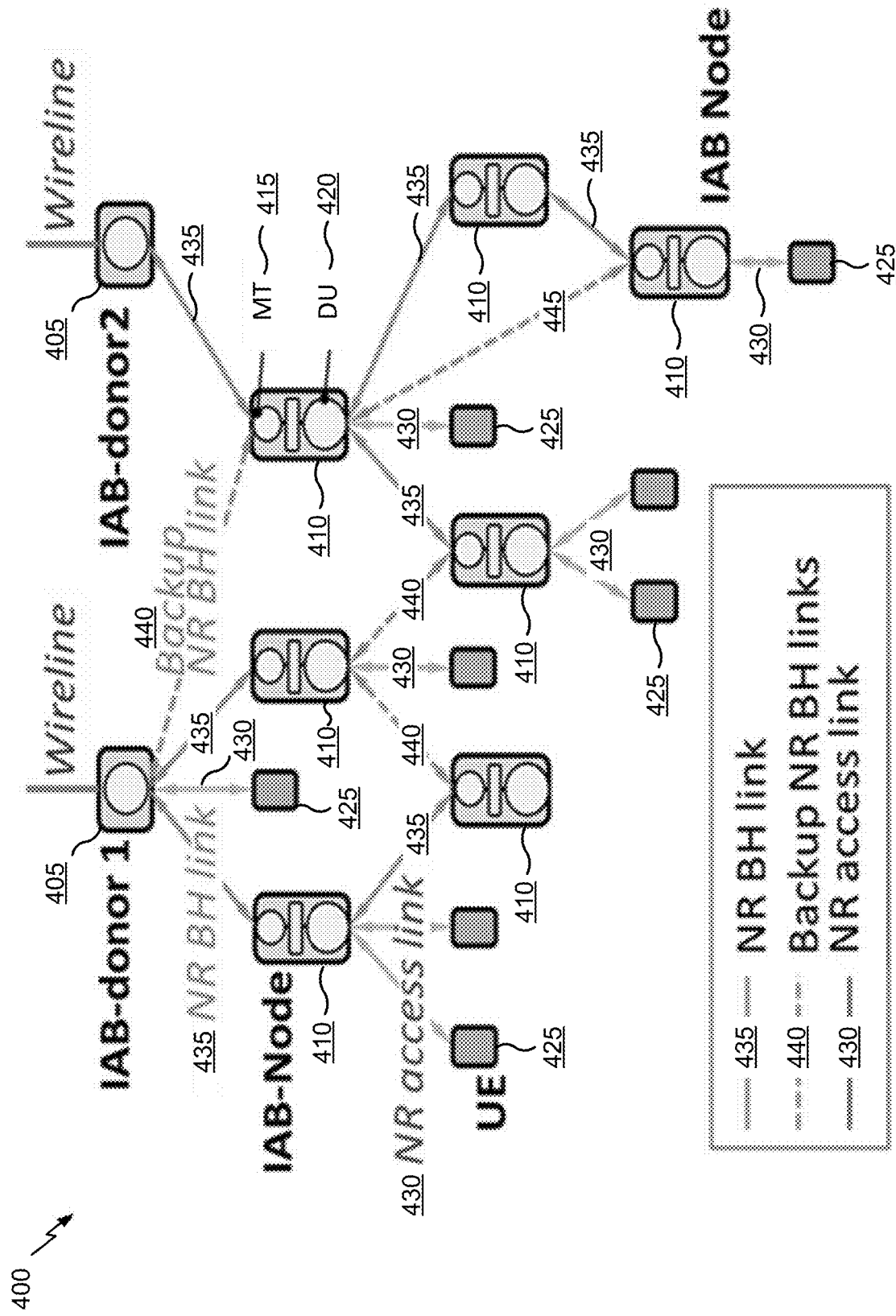
FIG. 4 is a diagram illustrating an example of an integrated access and backhaul (IAB) network architecture, in accordance with various aspects of the disclosure.

FIG. 4 is a diagram illustrating an example 400 of an integrated access and backhaul (IAB) network architecture, in accordance with various aspects of the disclosure.

As shown in FIG. 4, an IAB network may include anchor nodes 405, or IAB donors (shown as IAB-donor), that connect to a core network via a wired connection (shown as wireline). For example, an Ng interface of an anchor node 405 may terminate at a core network. Additionally, or alternatively, an anchor node 405 may connect to one or more devices of the core network that provide a core access and mobility management function (AMF). In some aspects, an anchor node 405 may include a base station 110, such as an anchor base station, as described above in connection with FIG. 3. In some aspects, an anchor node 405 may be associated with a central unit (CU) which may perform access node controller (ANC) functions, AMF functions, and/or the like.

As further shown in FIG. 4, the IAB network may include non-anchor nodes 410, or IAB nodes (shown as IAB-Node). A non-anchor node 410 may provide IAB functionality, and may include mobile terminal (MT) functions 415 (also sometimes referred to as UE functions (UEF)) and distributed unit (DU) functions 420 (also sometimes referred to as access node functions (ANF)). The MT functions 415 may be controlled and/or scheduled by another non-anchor node 410 and/or an anchor node 405. The DU functions 420 may control and/or schedule other non-anchor nodes 410 and/or UEs 425 (e.g., which may correspond to UEs 120). In some aspects, an anchor node 405 may include only DU functions 420, and not MT functions 415. That is, an anchor node 405 may control and schedule communications with non-anchor nodes 410 and/or UEs 425. Additionally, or alternatively, a UE 425 may include only MT functions 415, and not DU functions 420. That is, communications of a UE 425 may be controlled and/or scheduled by an anchor node 405 and/or a non-anchor node 410.

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function 420 of a parent node may control and/or schedule communications for child nodes of the parent node. A parent node may be an anchor node 405 or a non-anchor node 410, and the child node may be a non-anchor node 410 or a UE 425. Communications of an MT function 415 of a child node may be controlled and/or scheduled by a parent node of the child node.

As further shown in FIG. 4, a link between a UE 425 (e.g., which only has MT functions 415, and not DU functions 420) and an anchor node 405 or between a UE 425 and a non-anchor node 410 may be referred to as an access link 430. Access link 430 may be a wireless access link that provides a UE 425 with radio access to a core network via an anchor node 405, and optionally via one or more non-anchor nodes 410. Thus, the network illustrated in FIG. 4 may be referred to as a multi-hop IAB network.

As further shown in FIG. 4, a link between an anchor node 405 and a non-anchor node 410 or between two non-anchor nodes 410 may be referred to as a backhaul link 435. Backhaul link 435 may be a wireless backhaul link that provides a non-anchor node 410 with radio access to a core network via an anchor node 405, and optionally via one or more other non-anchor nodes 410. In some aspects, a backhaul link 435 may be a primary backhaul link (shown as backhaul link 435) or a secondary backhaul link 440 (e.g., a backup backhaul link). In some aspects, a secondary backhaul link 445 may be used if a primary backhaul link fails, becomes congested, becomes overloaded, and/or the like. Some propagation delay may be present between nodes, which may be mitigated using a timing advance (TA) value. Furthermore, some nodes may be associated with switching limitations, processing limitations, and/or the like, which may be mitigated using a timing assistance value, such as a delta value and/or the like.

As indicated above, FIG. 4 is provided as an example. Other examples are possible and may differ from what was described with regard to FIG. 4.

A child node may adjust an uplink transmission timing based at least in part on a timing advance (TA) value specified by a parent node of the child node. For example, the TA value may compensate for a delay between the parent node's downlink transmission to the child node (which arrives at the child node with some delay) and the parent node's reception of the child node's uplink transmission (which is presumably associated with a similar delay as the downlink transmission). The child node may advance the uplink transmission by an amount of time specified by the TA value so that the parent node's transmissions and receptions are aligned with each other.

In a multi-hop IAB network, the parent node can transmit a timing assistance value (which may be referred to, in some cases, as a delta value) for adjustment of a downlink transmission time of the child node (e.g., a transmission time for a transmission from the child node to a grandchild node). In this case, the child node may adjust the child node's downlink transmission time relative to the child node's downlink reception timing using TA/2+delta. TA/2 may be used since the TA value may take into account parent-to-child and child-to-parent propagation delay, so one-half of the TA value may more accurately reflect parent-to-child delay. The timing assistance value may account for, for example, at least one of an offset between the child node's downlink transmission and uplink reception times, a transmit-to-receive switching time of the child node, a hardware constraint of the parent node, a quantization error, and/or the like.

The timing assistance value may be applied by various nodes that are associated with different configurations (e.g., different subcarrier spacings, different frequency bands, different bandwidth part bandwidths, and/or the like). Thus, it may be inefficient to use a universal granularity value that is applicable across all nodes, since a node associated with a wide subcarrier spacing may have a more granular timing configuration than a node associated with a narrow subcarrier spacing. Furthermore, the node may be required to adjust a downlink transmission time in accordance with an accuracy parameter, such as an adjustment accuracy (e.g., a requirement that the node adjust the downlink transmission timing to within a particular range of the specified timing advance and/or timing assistance value), a transmission timing accuracy (e.g., a measure of the accuracy of the overall timing, such as the gap between the child node's observed transmission time and the child node's desired transmission time). However, in view of the different configurations described above, a universal approach for determining the accuracy parameter may be inefficient and may diminish the accuracy of the timing adjustment procedures.

Some techniques and apparatuses described herein provide signaling and determination of a granularity parameter and/or an accuracy parameter for a timing assistance value. For example, the granularity parameter and/or the accuracy parameter may be determined based at least in part on a configuration of a link between a child node (e.g., that receives the granularity parameter and/or the accuracy parameter from a parent node) and a grandchild node (e.g., that is to receive a downlink transmission from the child node), a subcarrier spacing of a synchronization signal block of the child node, a bandwidth associated with the child node, a frequency band (e.g., frequency range) of the link between the child node and the grandchild node, a configuration of the granularity parameter and/or the accuracy parameter by a central unit, and/or the like. In this way, efficiency of a multi-hop IAB network may be improved by more efficiently performing communications in view of timing differences between nodes of the multi-hop IAB network. Furthermore, by determining granularity parameters and/or accuracy parameters based at least in part on the child node and/or the grandchild node, accuracy and efficiency of configuration of timing advance values and timing assistance values may be improved.

The granularity parameter and the accuracy parameter are referred to herein as configuration parameters, but this should not be taken as a limiting description of the granularity parameter and the accuracy parameter. For example, the granularity parameter and the accuracy parameter can be communicated using any messaging format, such as downlink control information, dynamic signaling, radio resource control signaling, a media access control control element, and/or the like. Furthermore, the granularity parameter may be determined by one or more of the nodes described herein (e.g., a parent node, a node, a child node, a grandchild node, etc.) based at least in part on a configuration of a communication link associated with the granularity parameter. For example, in some aspects, the granularity parameter may not be communicated from one node to another.

Figure 5:
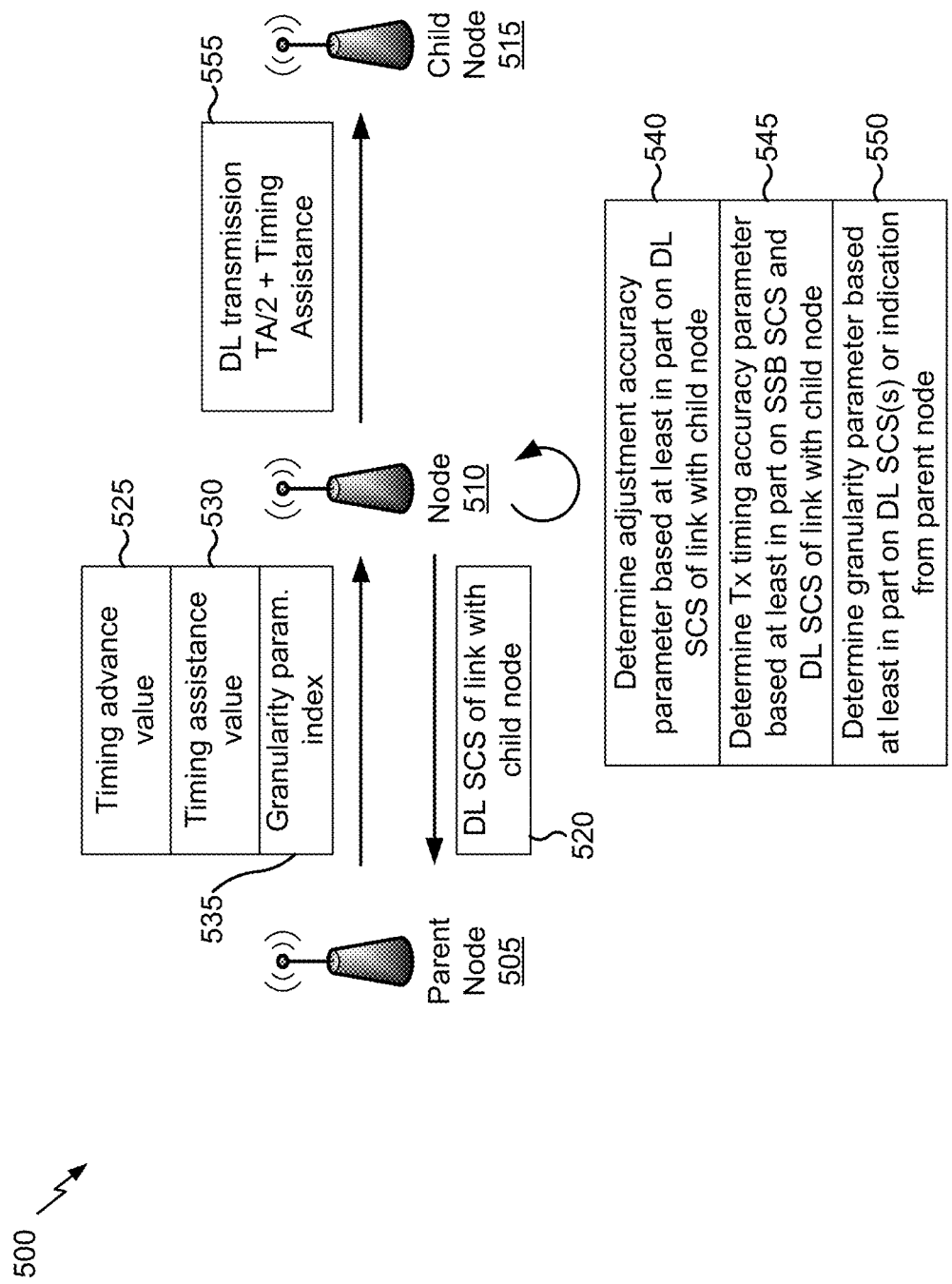
FIG. 5 is a diagram illustrating an example of timing adjustment in a multi-hop integrated access backhaul network using a granularity parameter and/or an accuracy parameter, in accordance with various aspects of the present disclosure.

FIG. 5 is a diagram illustrating an example 500 of timing adjustment in a multi-hop IAB network using a granularity parameter and/or an accuracy parameter, in accordance with various aspects of the present disclosure. As, shown, FIG. 5 includes a parent node 505, a node 510, and a child node 515. Parent node 505 may include anchor node 405, non-anchor node 410, DU 420, and/or the like. Node 510 may include non-anchor node 410, DU 420, and/or the like. Child node 515 may include non-anchor node 410, MT 415, DU 420, and/or the like. In some aspects, node 510 and/or child node 515 may include an MT 415 and/or a DU 420.

As shown by reference number 520, node 510 may provide information identifying a downlink (DL) subcarrier spacing (SCS) (e.g., tone spacing, numerology, and/or the like) to parent node 505. The DL SCS may be for a communication link between node 510 and child node 515. In some aspects, node 510 may provide information identifying multiple DL SCSs (e.g., for multiple links between node 510 and child node 515). In some aspects, node 510 may provide other information, such as information indicating a frequency range of the link between node 510 and child node 515 and/or the like. Parent node 505 and/or node 510 may use this information to determine a timing assistance value and/or a granularity parameter associated with the timing assistance value, as described in more detail below. It should be noted that "frequency band" is used interchangeably with "frequency range" herein.

As shown by reference numbers 525, parent node 505 may provide information identifying a timing advance (TA) value, and, as shown by reference number 530, parent node 505 may provide information identifying a timing assistance value. The TA value may identify a time offset to be used for communications between parent node 505 and node 510 (e.g., a timing gap between uplink transmission timing and downlink reception timing of node 510). The timing assistance value may identify a time offset to be used for communications from node 510 and child node 515. For example, the timing assistance value may include an index value that indicates a timing adjustment to be applied (e.g., in addition to the timing advance). In some aspects, the timing assistance value may be indicated by parent node 505 independently from the TA value. For example, the timing assistance value may be updated on an aperiodic basis.

In some aspects, the timing assistance value may include or be associated with information identifying a granularity parameter, such as a granularity parameter index, as shown by reference number 535. For example, in some cases, parent node 505 (or a CU associated with parent node 505) may provide information indicating a granularity parameter to be used to process the timing assistance value. In this case, parent node 505 (or the CU) may determine the granularity parameter based at least in part on the information identifying the DL SCS or the frequency range. In some aspects, node 510 may determine the granularity parameter, for example, based at least in part on the frequency range of the communication link between nodes 510 and 515.

As shown by reference number 540, node 510 may determine an adjustment accuracy parameter for the timing assistance value. The adjustment accuracy parameter may identify a permissible time range relative to the TA value and the timing assistance value. Node 510 may be required to adjust node 510's transmission time to within the permissible time range. For example, the adjustment accuracy may be expressed as $\pm N*T_c$, wherein $T_c$ is a timing unit (e.g., a physical layer timing unit, a sample time, and/or the like) and N is an integer. As shown, node 510 may determine the adjustment accuracy parameter based at least in part on the DL SCS of the link with the child node. For example, node 510 may determine the adjustment accuracy parameter based at least in part on information that identifies a mapping between SCSs and corresponding adjustment accuracies. In some aspects, a wider SCS may be associated with a shorter permissible time range, and a narrower SCS may be associated with a longer permissible time range, although other approaches may be used. In some aspects, node 510 may determine the adjustment accuracy parameter using another parameter in addition to or as an alternative to the DL SCS, such as a bandwidth of a bandwidth part (BWP) between node 510 and child node 515, a frequency range of the link between node 510 and child node 515, and/or the like.

As shown by reference number 545, node 510 may determine a transmission (Tx) timing accuracy parameter based at least in part on an SCS of a synchronization signal block (SSB) received from parent node 505, and based at least in part on the DL SCS of the link with child node 515. The transmission timing accuracy parameter may identify a requirement regarding the accuracy of the overall timing of the downlink transmission of node 510, such a timing error limit value that identifies a required accuracy of the gap between node 510's observed transmission time and node 510's desired transmission time. Node 510 may determine the transmission timing accuracy parameter based at least in part on the SCS of the SSB received from parent node 505 (since the SCS of the SSB received from parent node 505 may indicate an expected error in the timing of the SSB) and the DL SCS of the link with between node 510 and child node 515 (since the DL SCS may indicate an expected error in the timing of the DL transmission). In some aspects, node 510 may determine the transmission timing accuracy parameter based at least in part on information indicating a relationship between the SCS of the SSB, the DL SCS, and the transmission timing accuracy parameter. In some aspects, node 510 may determine the transmission timing parameter using another parameter in addition to or as an alternative to the DL SCS, such as a bandwidth of a bandwidth part (BWP) between node 510 and child node 515, a frequency range of the link between node 510 and child node 515, and/or the like.

As shown by reference number 550, node 510 may determine a granularity parameter for the timing assistance value. For example, node 510 may determine the granularity parameter in order to identify a timing offset corresponding to a TA value and/or a timing assistance value received from node 510. More particularly, node 510 may input the granularity parameter to an equation that identifies a mapping between granularity parameters, timing assistance values, and corresponding time offsets.

In some aspects, node 510 may determine the granularity parameter based at least in part on the DL SCS of the link between node 510 and child node 515. For example, node 510 may use the DL SCS as the granularity parameter, or may determine the granularity parameter based at least in part on information identifying DL SCSs and corresponding granularity parameters. This may conserve resources of a CU, parent node 505, and/or the like, that would otherwise be used to signal the granularity. Additionally, or alternatively, node 510 may determine the granularity parameter based at least in part on another parameter, such as a bandwidth of a bandwidth part between node 510 and child node 515, a frequency range of the link between node 510 and child node 515 (e.g., based at least in part on information identifying frequency ranges and corresponding granularity parameters), and/or the like.

In some aspects, node 510 may determine the granularity parameter based at least in part on signaling from parent node 505, a CU, and/or the like. For example, parent node 505 or the CU may transmit information identifying the granularity parameter. In some aspects, parent node 505 or the CU may determine the granularity parameter, for example, using the information identifying the DL SCS described in connection with reference number 520, above. In the case when node 510 is associated with multiple bandwidth parts between node 510 and child node 515, parent node 505 and/or the CU may provide information identifying a respective granularity parameter for each bandwidth part of the multiple bandwidth parts (e.g., based at least in part on information identifying respective SCSs and/or frequency ranges of the multiple bandwidth parts), or may determine a single granularity parameter based at least in part on information associated with each bandwidth part, as described in more detail below.

In some aspects, when node 510 is associated with multiple bandwidth parts, node 510 may determine a granularity parameter based at least in part on information associated with the multiple bandwidth parts. In such a case, the granularity parameter for a link may be fixed for a frequency band (e.g., frequency range) of the link. In this case, when different links are associated with different frequency bands, node 510 may select the granularity parameter of a frequency band with a highest DL SCS for child node 515. For example, if frequency band FR1 has a granularity parameter of A and is associated with a bandwidth part having a DL SCS of 60 kHz, and if frequency band FR2 has a granularity parameter of B and is associated with a bandwidth part having a DL SCS of 240 kHz, then node 510 (or parent node 505, or the CU) may select the granularity parameter of B. In some aspects, node 510 may apply the above approach when node 510 has not received an explicit indication of the granularity parameter from parent node 505 or the CU. In some aspects, node 510 may select a granularity parameter in accordance with a lowest SCS and/or the like.

In some aspects, if the timing assistance value is determined in accordance with a maximum DL SCS, and if node 510 is using a lower DL SCS than the maximum DL SCS, then parent node 505 may round the timing assistance value to a granular point (e.g., a nearest higher granular point, a nearest lower granular point, etc.) in accordance with a granularity parameter corresponding to the lower DL SCS. Thus, compatibility for bandwidth parts with lower DL SCSs may be preserved when the timing assistance value is determined in accordance with the maximum DL SCS.

As shown by reference number 555, node 510 may transmit a DL transmission to child node 515 using the timing assistance value and the TA value. For example, node 510 may transmit the DL transmission using a time offset of TA/2 plus the timing assistance value. Node 510 may determine the time offset in accordance with the adjustment accuracy parameter and the transmission timing accuracy parameter, and may interpret the timing assistance value, using the granularity parameter, to determine the time offset. In this way, node 510 determines an accuracy parameter and/or a granularity parameter based at least in part on a link with child node 515, thereby enabling the application of timing offsets to mitigate timing issues that are not rectified by the application of a timing advance.

It should be noted that any of the techniques described above for determining an accuracy parameter can be used to determine a granularity parameter, and that any of the techniques described above for determining a granularity parameter can be used to determine an accuracy parameter.

As indicated above, FIG. 5 is provided as an example. Other examples may differ from what is described with respect to FIG. 5.

Figure 6:
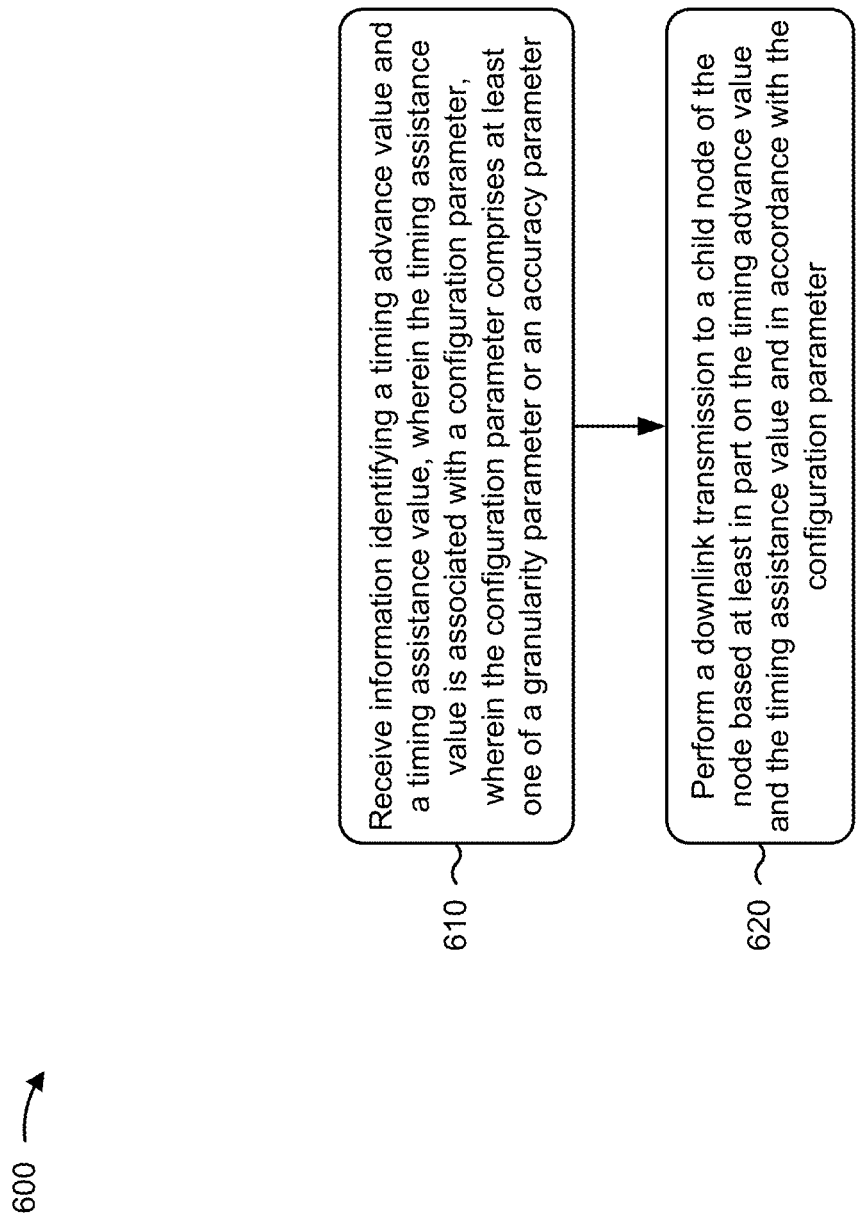
FIG. 6 is a diagram illustrating an example process performed, for example, by a node of an integrated access backhaul network, in accordance with various aspects of the present disclosure.

FIG. 6 is a diagram illustrating an example process 600 performed, for example, by a node, in accordance with various aspects of the present disclosure. Example process 600 is an example where a node (e.g., parent node 505, node 510, child node 515, and/or the like) performs operations associated with granularity and adjustment accuracy in an IAB network.

As shown in FIG. 6, in some aspects, process 600 may include receiving information identifying a timing advance value and a timing assistance value, wherein the timing assistance value is associated with a configuration parameter, wherein the configuration parameter comprises at least one of a granularity parameter or an accuracy parameter (block 610). For example, the node (e.g., using antenna 234, DEMOD 232, MIMO detector 236, receive processor 238, controller/processor 240, and/or the like) may receive information identifying a timing advance value and a timing assistance value, as described above. In some aspects, the timing assistance value is associated with a configuration parameter. In some aspects, the configuration parameter comprises at least one of a granularity parameter or an accuracy parameter.

As further shown in FIG. 6, in some aspects, process 600 may include performing a downlink transmission to a child node of the node based at least in part on the timing advance value and the timing assistance value and in accordance with the configuration parameter (block 620). For example, the node (e.g., using controller/processor 240, transmit processor 220, TX MIMO processor 230, MOD 232, antenna 234, and/or the like) may perform a downlink transmission to a child node of the node based at least in part on the timing advance value and the timing assistance value and in accordance with the configuration parameter, as described above.

Process 600 may include additional aspects, such as any single implementation or any combination of aspects described below and/or in connection with one or more other processes described elsewhere herein.

In a first aspect, a combination of the timing advance value and the timing assistance value identifies a time offset between a downlink reception timing of the node and a downlink transmission timing of the node.

In a second aspect, alone or in combination with the first aspect, the downlink reception timing is a time when the node receives a signal from a parent node of the node, wherein the downlink transmission timing is a time when the node transmits a corresponding signal to the child node.

In a third aspect, alone or in combination with the first aspect and/or the second aspect, the node may determine the accuracy parameter before performing the downlink transmission.

In a fourth aspect, alone or in combination with one or more of the first through third aspects, the accuracy parameter comprises an adjustment accuracy parameter.

In a fifth aspect, alone or in combination with one or more of the first through fourth aspects, the accuracy parameter comprises a transmission timing accuracy parameter.

In a sixth aspect, alone or in combination with one or more of the first through fifth aspects, the configuration parameter is based at least in part on a subcarrier spacing of a synchronization signal block received by the node and a subcarrier spacing over a communication link between the node and the child node.

In a seventh aspect, alone or in combination with one or more of the first through sixth aspects, the configuration parameter is based at least in part on a bandwidth of a bandwidth part between the node and the child node.

In an eighth aspect, alone or in combination with one or more of the first through seventh aspects, the node may determine the granularity parameter before performing the downlink transmission.

In a ninth aspect, alone or in combination with one or more of the first through eighth aspects, the configuration parameter is based at least in part on a subcarrier spacing of a communication link between the node and the child node.

In a tenth aspect, alone or in combination with one or more of the first through ninth aspects, the node may transmit, to a parent node from which the timing advance value and the timing assistance value are received, information identifying the subcarrier spacing of the communication link between the node and the child node.

In an eleventh aspect, alone or in combination with one or more of the first through tenth aspects, the accuracy parameter is based at least in part on a frequency band of a communication link between the node and the child node.

In a twelfth aspect, alone or in combination with one or more of the first through eleventh aspects, when a communication link between the node and the child node is associated with multiple bandwidth parts, the configuration parameter is based at least in part on a maximum subcarrier spacing of the communication link between the node and the child node.

In a thirteenth aspect, alone or in combination with one or more of the first through twelfth aspects, the configuration parameter is rounded to a nearest permissible granular value of the node based at least in part on a determination that the node uses a lower subcarrier spacing than the maximum subcarrier spacing.

In a fourteenth aspect, alone or in combination with one or more of the first through thirteenth aspects, the configuration parameter is based at least in part on a subcarrier spacing and a frequency band of a communication link between the node and the child node based at least in part on information specifying the configuration parameter not being received from a central unit.

In a fifteenth aspect, alone or in combination with one or more of the first through fourteenth aspects, the configuration parameter is specified by information received from a central unit.

In a sixteenth aspect, alone or in combination with one or more of the first through fifteenth aspects, the configuration parameter comprises the granularity parameter, and the granularity parameter is based at least in part on a frequency band of a communication link between the node and the child node.

In a seventeenth aspect, alone or in combination with one or more of the first through sixteenth aspects, the node and the child node are associated with an integrated access and backhaul (IAB) deployment.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a parent node of an IAB deployment, in accordance with various aspects of the present disclosure. Example process 700 is an example where a parent node (e.g., parent node 505 and/or the like) performs operations associated with granularity and adjustment accuracy in an IAB network.

As shown in FIG. 7, in some aspects, process 700 may include determining a configuration parameter for a timing assistance value, wherein the configuration parameter comprises a granularity parameter (block 710). For example, the parent node (e.g., using controller/processor 240, transmit processor 220, TX MIMO processor 230, MOD 232, antenna 234, and/or the like) may determine a configuration parameter for a timing assistance value. The configuration parameter may include at least one of a granularity parameter or an accuracy parameter.

As further shown in FIG. 7, in some aspects, process 700 may include transmitting, to a node, information identifying the timing assistance value based at least in part on the configuration parameter (block 720). For example, the parent node (e.g., using controller/processor 240, transmit processor 220, TX MIMO processor 230, MOD 232, antenna 234, and/or the like) may transmit to a node (e.g., node 510 and/or the like), information identifying the timing assistance value based at least in part on the configuration parameter, as described above. For example, the timing assistance value may have a bit value that is generated based at least in part on the configuration parameter so that a recipient can determine the timing assistance value in accordance with the configuration parameter.

Process 700 may include additional aspects, such as any single implementation or any combination of aspects described below and/or in connection with one or more other processes described elsewhere herein.

In a first aspect, the parent node may receive, from the node, information regarding a communication link between the node and a child node of the node, wherein the determination of the configuration parameter is based at least in part on the information regarding the communication link.

In a second aspect, alone or in combination with the first aspect, process 700 includes transmitting, to the node, information identifying a timing advance value.

In a third aspect, alone or in combination with one or more of the first and second aspects, a combination of the timing advance value and the timing assistance value identifies a time offset between a downlink reception timing of the node and a downlink transmission timing of the node.

In a fourth aspect, alone or in combination with one or more of the first and third aspects, the downlink reception timing is a time when the node receives a signal from the parent node of the node, and the downlink transmission timing is a time when the node transmits a corresponding to the child node.

In a fifth aspect, alone or in combination with one or more of the first and fourth aspects, the parent node and the node are associated with an integrated access and backhaul (IAB) deployment.

Process 700 may include one or more of the first through seventeenth aspects of process 600.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more."

Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a node, comprising:
   transmitting information regarding a communication link between the node and a child node of the node,
      wherein the information regarding the communication link identifies at least one of:
         a subcarrier spacing of the communication link,
         a bandwidth of a bandwidth part of the communication link, or
         a frequency range of the communication link;
   receiving information identifying a timing advance value and a timing assistance value, wherein the timing assistance value is associated with a configuration parameter,
      wherein the configuration parameter comprises at least one of a granularity parameter or an accuracy parameter, and
      wherein the configuration parameter is based at least in part on the information regarding the communication link; and
   performing a downlink transmission to the child node based at least in part on the timing advance value and the timing assistance value and in accordance with the configuration parameter.

2. The method of claim 1, wherein the configuration parameter comprises the granularity parameter, and wherein the granularity parameter is based at least in part on a frequency band of the communication link.

3. The method of claim 1, wherein a combination of the timing advance value and the timing assistance value identifies a time offset between a downlink reception timing of the node and a downlink transmission timing of the node.

4. The method of claim 3, wherein the downlink reception timing is a time when the node receives a signal from a parent node of the node, and wherein the downlink transmission timing is a time when the node transmits a corresponding signal to the child node.

5. The method of claim 1, wherein the configuration parameter is based at least in part on the bandwidth of the bandwidth part of the communication link.

6. The method of claim 1, further comprising:
   determining the granularity parameter before performing the downlink transmission.

7. The method of claim 1, wherein the configuration parameter is based at least in part on the subcarrier spacing and a frequency band of the communication link based at least in part on information specifying the configuration parameter not being received from a central unit.

8. The method of claim 1, wherein the configuration parameter is specified by information received from a central unit.

9. The method of claim 1, wherein the node and the child node are associated with an integrated access and backhaul (IAB) deployment.

10. A method of wireless communication performed by a parent node, comprising:
    receiving information regarding a communication link between a node and a child node of the node,
       wherein the information regarding the communication link identifies at least one of:
          a subcarrier spacing of the communication link,
          a bandwidth of a bandwidth part of the communication link, or
          a frequency range of the communication link;
    determining a configuration parameter for a timing assistance value,
       wherein the determination of the configuration parameter is based at least in part on the information regarding the communication link, and
       wherein the configuration parameter comprises a granularity parameter; and
    transmitting, to the node, information identifying the timing assistance value based at least in part on the configuration parameter.

11. The method of claim 10, further comprising:
    transmitting, to the node, information identifying a timing advance value.

12. The method of claim 11, wherein a combination of the timing advance value and the timing assistance value identifies a time offset between a downlink reception timing of the node and a downlink transmission timing of the node.

13. The method of claim 12, wherein the downlink reception timing is a time when the node receives a signal from the parent node, and wherein the downlink transmission timing is a time when the node transmits a corresponding signal to the child node.

14. The method of claim 10, wherein the parent node and the node are associated with an integrated access and backhaul (IAB) deployment.

15. A node for wireless communication, comprising:
    a memory; and
    one or more processors coupled to the memory, the memory and the one or more processors configured to:
       transmit information regarding a communication link between the node and a child node of the node,
          wherein the information regarding the communication link identifies at least one of:
             a subcarrier spacing of the communication link,
             a bandwidth of a bandwidth part of the communication link, or
             a frequency range of the communication link;
       receive information identifying a timing advance value and a timing assistance value, wherein the timing assistance value is associated with a configuration parameter,
          wherein the configuration parameter comprises at least one of a granularity parameter or an accuracy parameter, and
          wherein the configuration parameter is based at least in part on the information regarding the communication link; and
       perform a downlink transmission to the child node of the node based at least in part on the timing advance value and the timing assistance value and in accordance with the configuration parameter.

16. The node of claim 15, wherein the configuration parameter comprises the granularity parameter, and wherein the granularity parameter is based at least in part on a frequency band of the communication link.

17. The node of claim 15, wherein a combination of the timing advance value and the timing assistance value identifies a time offset between a downlink reception timing of the node and a downlink transmission timing of the node.

18. The node of claim 17, wherein the downlink reception timing is a time when the node receives a signal from a parent node of the node, and wherein the downlink transmission timing is a time when the node transmits a corresponding signal to the child node.

19. The node of claim 15, wherein the configuration parameter is based at least in part on the bandwidth of the bandwidth part of the communication link.

20. The node of claim 15, wherein the one or more processors are further configured to:
    determine the granularity parameter before performing the downlink transmission.

21. The node of claim 15, wherein the configuration parameter is based at least in part on the subcarrier spacing and a frequency band of the communication link based at least in part on information specifying the configuration parameter not being received from a central unit.

22. The node of claim 15, wherein the configuration parameter is specified by information received from a central unit.

23. The node of claim 15, wherein the node and the child node are associated with an integrated access and backhaul (IAB) deployment.

24. A parent node for wireless communication, comprising:
    a memory; and
    one or more processors coupled to the memory, the memory and the one or more processors configured to:
        receive information regarding a communication link between a node and a child node of the node,
            wherein the information regarding the communication link identifies at least one of:
                a subcarrier spacing of the communication link,
                a bandwidth of a bandwidth part of the communication link, or
                a frequency range of the communication link;
        determine a configuration parameter for a timing assistance value,
            wherein the determination of the configuration parameter is based at least in part on the information regarding the communication link, and
            wherein the configuration parameter comprises a granularity parameter; and
        transmit, to the node, information identifying the timing assistance value based at least in part on the configuration parameter.

25. The parent node of claim 24, wherein the one or more processors are further configured to:
    transmit, to the node, information identifying a timing advance value.

26. The parent node of claim 25, wherein a combination of the timing advance value and the timing assistance value identifies a time offset between a downlink reception timing of the node and a downlink transmission timing of the node.

27. The parent node of claim 26, wherein the downlink reception timing is a time when the node receives a signal from the parent node, and wherein the downlink transmission timing is a time when the node transmits a corresponding signal to the child node.

28. The parent node of claim 24, wherein the parent node and the node are associated with an integrated access and backhaul (TAB) deployment.

29. The method of claim 1, wherein the information regarding the communication link identifies the frequency range of the communication link as one of:
    frequency range 1 (FR1), or
    frequency range 2 (FR2).

30. The method of claim 10, wherein the information regarding the communication link identifies the frequency range of the communication link as one of:
    frequency range 1 (FR1), or
    frequency range 2 (FR2).

31. The node of claim 15, wherein the information regarding the communication link identifies the frequency range of the communication link as one of:
    frequency range 1 (FR1), or
    frequency range 2 (FR2).

32. The parent node of claim 24, wherein the information regarding the communication link identifies the frequency range of the communication link as one of:
    frequency range 1 (FR1), or
    frequency range 2 (FR2).

* * * * *